(12) United States Patent
Strong et al.

(10) Patent No.: US 8,489,219 B1
(45) Date of Patent: Jul. 16, 2013

(54) PROCESS FOR MAKING LOOSE BUFFER TUBES HAVING CONTROLLED EXCESS FIBER LENGTH AND REDUCED POST-EXTRUSION SHRINKAGE

(75) Inventors: Patrick King Strong, Connelly Springs, NC (US); Freddy Eugene Lindsey, Connelly Springs, NC (US); Jeffrey Scott Barker, Statesville, NC (US); William Mark Smartt, Mooresville, NC (US)

(73) Assignee: Draka Comteq B.V., Amsterdam (NL)

( * ) Notice: Subject to any disclaimer, the term of this patent is extended or adjusted under 35 U.S.C. 154(b) by 648 days.

(21) Appl. No.: 12/696,338

(22) Filed: Jan. 29, 2010

Related U.S. Application Data

(60) Provisional application No. 61/148,745, filed on Jan. 30, 2009.

(51) Int. Cl.
*G06F 9/312* (2006.01)

(52) U.S. Cl.
USPC ............. 700/105; 700/95; 700/108; 700/109; 700/122

(58) Field of Classification Search
None
See application file for complete search history.

(56) References Cited

U.S. PATENT DOCUMENTS

| | | | |
|---|---|---|---|
| 4,446,686 A * | 5/1984 | Panuska et al. | 57/6 |
| 4,574,574 A * | 3/1986 | Knaak | 57/59 |
| 4,640,576 A | 2/1987 | Eastwood et al. | |
| 4,772,435 A | 9/1988 | Schlaeppi et al. | |
| 4,814,116 A | 3/1989 | Oestreich et al. | |
| 4,838,643 A | 6/1989 | Hodges et al. | |
| 4,893,998 A | 1/1990 | Schlaeppi et al. | |
| 4,921,413 A * | 5/1990 | Blew | 425/71 |
| 4,983,333 A * | 1/1991 | Blew | 264/1.25 |
| 5,372,757 A | 12/1994 | Schneider | |
| 5,574,816 A | 11/1996 | Yang et al. | |
| 5,717,805 A | 2/1998 | Stulpin | |
| 5,761,362 A | 6/1998 | Yang et al. | |
| 5,911,023 A | 6/1999 | Risch et al. | |
| 5,938,987 A * | 8/1999 | Paivinen | 264/1.28 |
| 5,982,968 A | 11/1999 | Stulpin | |
| 6,035,087 A | 3/2000 | Bonicel et al. | |
| 6,054,070 A * | 4/2000 | Tokairin et al. | 264/1.28 |
| 6,066,275 A * | 5/2000 | Robinson et al. | 264/40.1 |
| 6,066,397 A | 5/2000 | Risch et al. | |

(Continued)

FOREIGN PATENT DOCUMENTS

| EP | 1921478 A1 | 5/2008 |
|---|---|---|
| WO | 2009/062131 A1 | 5/2009 |

OTHER PUBLICATIONS

Montgomery, et al., "Optimizing the UV-Curable Tight Buffering Fiber Process," DSM Desotech, Inc., Elgin, IL, http://www.dsm.com/en_US/downloads/dsmd/WireAsia.pdf, downloaded on Dec. 3, 2008, pp. 1-5.

(Continued)

*Primary Examiner* — Kavita Padmanabhan
*Assistant Examiner* — Christopher E Everett
(74) *Attorney, Agent, or Firm* — Summa, Additon & Ashe, P.A.

(57) ABSTRACT

Disclosed is an improved buffering method for controlling excess fiber length (EFL) and reducing post-extrusion shrinkage in loose buffer tubes. In this way, the method yields first-quality loose buffer tubes not only during steady-state operation but also during ramping, thereby increasing production efficiency and reducing waste.

32 Claims, 1 Drawing Sheet

U.S. PATENT DOCUMENTS

| | | | |
|---|---|---|---|
| 6,085,009 A | 7/2000 | Risch et al. |
| 6,134,363 A | 10/2000 | Hinson et al. |
| 6,175,677 B1 | 1/2001 | Yang et al. |
| 6,181,857 B1 | 1/2001 | Emeterio et al. |
| 6,210,802 B1 | 4/2001 | Risch et al. |
| 6,215,931 B1 | 4/2001 | Risch et al. |
| 6,314,224 B1 | 11/2001 | Stevens et al. |
| 6,321,012 B1 | 11/2001 | Shen |
| 6,321,014 B1 | 11/2001 | Overton et al. |
| 6,334,016 B1 | 12/2001 | Greer, IV |
| 6,381,390 B1 | 4/2002 | Hutton et al. |
| 6,493,491 B1 | 12/2002 | Shen et al. |
| 6,569,247 B1 | 5/2003 | Aura et al. |
| 6,603,908 B2 | 8/2003 | Dallas et al. |
| 6,618,538 B2 | 9/2003 | Nechitailo et al. |
| 6,634,075 B1 | 10/2003 | Lento |
| 6,658,184 B2 | 12/2003 | Bourget et al. |
| 6,749,446 B2 | 6/2004 | Nechitailo |
| 6,827,884 B2 | 12/2004 | Marelli et al. |
| 6,834,553 B2 * | 12/2004 | Ravichandran et al. ........ 73/829 |
| 6,912,347 B2 | 6/2005 | Rossi et al. |
| 6,922,515 B2 | 7/2005 | Nechitailo et al. |
| 6,941,049 B2 | 9/2005 | Risch et al. |
| 7,035,706 B2 * | 4/2006 | Franz ..................... 700/122 |
| 7,045,010 B2 | 5/2006 | Sturman, Jr. |
| 7,092,781 B2 * | 8/2006 | Franz et al. ................ 700/122 |
| 7,162,128 B2 | 1/2007 | Lovie et al. |
| 7,200,307 B2 * | 4/2007 | Bau' et al. ................ 385/111 |
| 7,272,282 B1 | 9/2007 | Seddon et al. |
| 7,322,122 B2 | 1/2008 | Overton et al. |
| 7,346,244 B2 | 3/2008 | Gowan et al. |
| 7,356,234 B2 | 4/2008 | de Montmorillon et al. |
| 7,373,055 B1 | 5/2008 | Strong |
| 7,445,811 B2 | 11/2008 | Elomaki et al. |
| 7,483,613 B2 | 1/2009 | Bigot-Astruc et al. |
| 7,515,795 B2 | 4/2009 | Overton et al. |
| 7,555,186 B2 | 6/2009 | Flammer et al. |
| 7,567,739 B2 | 7/2009 | Overton et al. |
| 7,570,852 B2 | 8/2009 | Nothofer et al. |
| 7,587,111 B2 | 9/2009 | de Montmorillon et al. |
| 7,599,589 B2 | 10/2009 | Overton et al. |
| 7,623,747 B2 | 11/2009 | de Montmorillon et al. |
| 7,639,915 B2 | 12/2009 | Parris et al. |
| 7,646,952 B2 | 1/2010 | Parris |
| 7,646,954 B2 | 1/2010 | Tatat |
| 7,724,998 B2 | 5/2010 | Parris et al. |
| 7,817,891 B2 | 10/2010 | Lavenne et al. |
| 2008/0056651 A1 | 3/2008 | Nothofer et al. |
| 2008/0193090 A1 | 8/2008 | Riddett et al. |
| 2008/0292262 A1 | 11/2008 | Overton et al. |
| 2009/0175583 A1 | 7/2009 | Overton |
| 2009/0214167 A1 | 8/2009 | Lookadoo et al. |
| 2009/0252469 A1 | 10/2009 | Sillard et al. |
| 2009/0279833 A1 | 11/2009 | Overton et al. |
| 2009/0279835 A1 | 11/2009 | de Montmorillon et al. |
| 2009/0279836 A1 | 11/2009 | de Montmorillon et al. |
| 2009/0297107 A1 | 12/2009 | Tatat |
| 2010/0021170 A1 | 1/2010 | Lumineau et al. |
| 2010/0028020 A1 | 2/2010 | Gholami et al. |
| 2010/0067855 A1 | 3/2010 | Barker |
| 2010/0067857 A1 | 3/2010 | Lovie et al. |
| 2010/0092135 A1 | 4/2010 | Barker et al. |
| 2010/0092138 A1 | 4/2010 | Overton |
| 2010/0092139 A1 | 4/2010 | Overton |
| 2010/0092140 A1 | 4/2010 | Overton |
| 2010/0118388 A1 | 5/2010 | Pastouret et al. |
| 2010/0119202 A1 | 5/2010 | Overton |
| 2010/0135623 A1 | 6/2010 | Overton |
| 2010/0135624 A1 | 6/2010 | Overton et al. |
| 2010/0135625 A1 | 6/2010 | Overton |
| 2010/0135627 A1 | 6/2010 | Pastouret et al. |
| 2010/0142033 A1 | 6/2010 | Regnier et al. |
| 2010/0142969 A1 | 6/2010 | Gholami et al. |
| 2010/0150505 A1 | 6/2010 | Testu et al. |
| 2010/0154479 A1 | 6/2010 | Milicevic et al. |
| 2010/0166375 A1 | 7/2010 | Parris |
| 2010/0171945 A1 | 7/2010 | Gholami et al. |
| 2010/0183821 A1 | 7/2010 | Hartsuiker et al. |
| 2010/0189397 A1 | 7/2010 | Richard et al. |
| 2010/0189399 A1 | 7/2010 | Sillard et al. |
| 2010/0189400 A1 | 7/2010 | Sillard et al. |
| 2011/0044595 A1 | 2/2011 | Sillard et al. |

OTHER PUBLICATIONS

Rechberger "High speed Buffering and Lay Plate SZ-Stranding of Fibre Optical Cables," Rosendahl Maschinen GmbH, Austria, pp. 1-7, Jun. 4, 2002, pp. 1-7.

"FOC-Dry Tube Production RL-R/OFC40 Clenching Concept Clenching Caterpillar NCA 210," http://www.rosendahlaustria.com/custom/rosendahlaustria/Rosendahl_Products_PDF/productinfo_dry_tube_clenching_caterpillar_nca_210.pdf, downloaded on Nov. 13, 2008, pp. 1-2.

Rosendahl Product Sheet, "Dry Tube production—a clenching concept," http://rosendahl.hgs.at/default_rosendahl.aspx?lng=&menueid=388&contentid=971&back=1, downloaded on Dec. 23, 2008, pp. 1-2.

Applicants's IDS Transmittal Letter in the present application dated May 26, 2011, pp. 1-2.

* cited by examiner

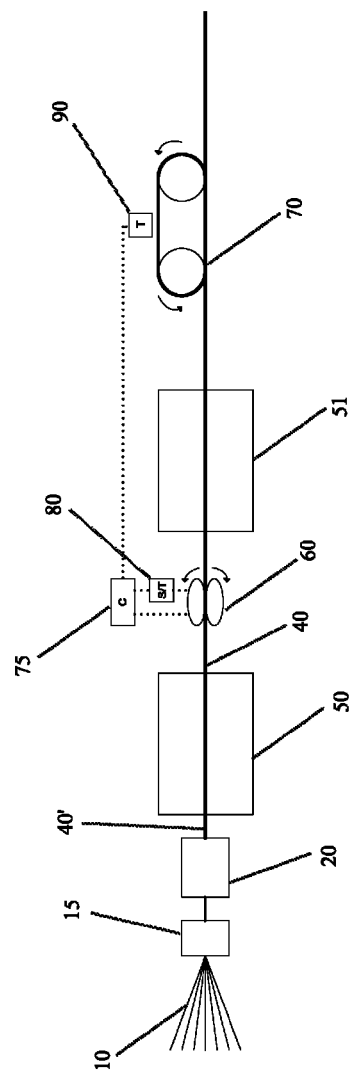

8,489,219 B1

PROCESS FOR MAKING LOOSE BUFFER TUBES HAVING CONTROLLED EXCESS FIBER LENGTH AND REDUCED POST-EXTRUSION SHRINKAGE

CROSS-REFERENCE TO PRIORITY APPLICATION

This application claims the benefit of commonly assigned U.S. Patent Application No. 61/148,745, for an Improved Process for Making Loose Buffer Tubes Having Controlled Excess Fiber Length and Reduced Post-Extrusion Shrinkage (filed Jan. 30, 2009), which is hereby incorporated by reference in its entirety.

FIELD OF THE INVENTION

The present invention relates to an improved process for employing a buffering-assist capstan in a way that controls excess fiber length (EFL) and reduces post-extrusion shrinkage in loose buffer tubes, especially during buffering startup or shutdown.

BACKGROUND

Reduced-size cable designs are requiring ever smaller buffer tubes. As buffer tubes become increasingly small, however, excess fiber length (EFL) becomes a significant problem. As will be known by those having ordinary skill in the art, EFL can occur as a result of buffer-tube shrinkage during processing and thereafter as post-extrusion shrinkage (PES).

Various buffering processes have been disclosed with respect to loose buffer tubes to control the relative lengths of optical fibers and their surrounding tubes (i.e., fiber-to-sheath length ratio). For example, reducing buffer-tube shrinkage can be achieved by slowing processing speeds, thereby providing a larger cooling window, or by increasing buffer-tube cooling via improved cooling systems.

Exemplary patents with respect to controlling fiber-to-sheath length ratios include: U.S. Pat. No. 4,893,998 (Schlaeppi et al.), which is assigned to Maillefer S.A.; U.S. Pat. No. 5,372,757 (Schneider), which is assigned to Tensor Machinery, Ltd.; U.S. Pat. No. 6,634,075 (Lento), which is assigned to Nextrom Holding S.A; and U.S. Pat. No. 7,373,055 (Strong), which is commonly assigned to Draka Comteq BV. Each of these U.S. patents is hereby incorporated by reference in its entirety.

Demand for smaller optical-fiber cables (and smaller buffer tubes) intensifies the need to increase manufacturing production rates of loose buffer tubes. That said, merely increasing production rates leads to unsatisfactory results. For example, at higher line speeds, the time for cooling the buffer tube before the optical fibers couple to the buffer tube is reduced. In other words, at higher line speeds coupling of the optical fibers tends to occur too quickly. Consequently, more buffer-tube shrinkage is likely both during buffer-tube processing and after buffer-tube processing (e.g., as the buffer tube slowly cools over time on a take-up reel or is subjected to elevated temperatures during end use).

After the optical fibers are coupled to the buffer tube, any buffer-tube shrinkage increases EFL. Stated otherwise, less cooling time before coupling leads to more buffer-tube shrinkage after coupling, and thus undesirable increases in EFL.

Reducing, if not eliminating, buffer-tube shrinkage after optical-fiber coupling is desirable, because it will result in not only lower EFL but also better EFL control, especially in deployments in which buffer tubes are subjected to extreme temperature variations (e.g., during mid-span access). Therefore, there is a need to provide a method for making loose buffer tubes in a way that controls excess fiber length (EFL) and post-extrusion shrinkage (PES) yet provides high production efficiency, even during the startup or shutdown of buffering operations.

SUMMARY

Accordingly, the present buffering process provides controlled ramping to control excess fiber length (EFL) and reduce post-extrusion shrinkage (PES) in loose buffer tubes. In this way, the buffering process ensures that first-quality loose buffer tubes are produced not only during steady-state operation but also during ramping, thereby increasing overall production efficiency and reducing waste.

As herein disclosed, the buffering process employs a buffering-assist capstan not only during steady-state operation but also during ramping (e.g., during startup or shutdown of the buffering operations). The buffering-assist capstan subjects a buffer tube to a temporary, mid-production tension that facilitates shrinkage of the buffer tube in the absence of positive tension before the enclosed optical fibers become fully coupled to the buffer tube.

The buffering process can measure and control buffer-tube tension during ramping (i.e., tension-controlled ramping) to further (i) improve control over excess fiber length (EFL) and (ii) reduce post-extrusion shrinkage (PES).

The foregoing illustrative summary, as well as other exemplary objectives and/or advantages of the invention, and the manner in which the same are accomplished, are further explained within the following detailed description and its accompanying drawing.

BRIEF DESCRIPTION OF THE DRAWING

FIG. 1 schematically depicts an exemplary buffering operation that employs a buffering-assist capstan in accordance with the present invention.

DETAILED DESCRIPTION

The present invention embraces an improved method for controlling buffer-tube shrinkage during processing and reducing post-extrusion shrinkage (PES) after processing, thereby controlling excess fiber length (EFL).

Steady-State Buffering

FIG. 1 schematically depicts a buffering operation that employs a buffering-assist capstan to form a loose buffer-tube structure. Although FIG. 1 illustrates distinct optical fibers 10, it is within the scope of the present buffering process instead to employ optical fiber ribbons or other optical elements (e.g., optical-fiber bundles).

Optical fibers 10 are coated with a grease-like gel at a gel applicator 15, then pulled through an extruder crosshead 20, which forms a molten polymeric sheath 40' around the optical fibers 10 (i.e., the polymeric sheath 40' surrounds both the grease-like gel and the optical fibers 10). Sufficient grease-like gel is initially applied to the optical fibers 10 so as to substantially fill the polymeric sheath 40'. Alternatively, the extruder crosshead 20 may concurrently form the molten polymeric sheath 40' while filling the annular space between the optical fibers 10 and the molten polymeric sheath 40' with the grease-like gel.

The polymeric sheath 40' may be formed, for example, from a polyolefin (e.g., nucleated polyethylene, nucleated polypropylene, or a copolymer or a blend thereof), polyester (e.g., polybutylene terephthalate), or a polyamide.

After its extrusion, the molten polymeric sheath 40' is submerged in a water-filled cooling vat 50 that quickly solidifies the polymeric sheath 40', thereby forming a buffer tube 40. As will be known to those having ordinary skill in the art, the buffer tube 40 shrinks as it cools.

As schematically depicted in FIG. 1, a buffering-assist capstan 60 (i.e., the "clincher") is provided between two water-filled cooling vats 50 and 51, whereby the buffering-assist capstan 60 is maintained in somewhat dry conditions. Alternatively, the buffering-assist capstan 60 may be positioned within either water-filled cooling vat 50 or 51.

Also as schematically depicted in FIG. 1, the buffer-assist capstan 60 typically includes upper and lower rotating rubber traction belts that grip and drive the buffer tube 40. An exemplary buffering-assist capstan for use in the present buffering process is commercially available from Maillefer S.A.

The buffer tube 40 emerges from the water-filled cooling vat 51, whereupon it is repeatedly turned (e.g., four to ten rotations) through a wet capstan 70, thereby promoting coupling of the buffer tube 40 and the enclosed optical fibers 10. It is the wet capstan 70 that effectively defines the operational line speed.

During steady-state operations (i.e., at constant line speeds), the buffering-assist capstan 60 typically runs faster than does the wet capstan 70. This speed difference is selected to accommodate buffer-tube shrinkage that occurs between the buffering-assist capstan 60 and the wet capstan 70. By way of illustration, whereas the wet capstan 70 might run at 1.00× meters per minute (mpm), the buffering-assist capstan 60 might run between about 1.01× to 1.02× meters per minute (mpm).

In effect, the buffering-assist capstan 60 imparts a downstream force (i.e., a force in the direction of processing) upon the buffer tube 40. This promotes elongation of the buffer tube 40 between the extruder crosshead 20 and the buffering-assist capstan 60. By way of example, it has been observed that a tension of between about 10-20 N is imparted to a 2.7 millimeter buffer tube 40 during typical processing conditions.

The aforementioned downstream force applied by the buffering-assist capstan 60 may subject the buffer tube 40 to a compressive force (e.g., negative tension) between the buffering-assist capstan 60 and the wet capstan 70. The downstream compressive force, if present, is sometimes indicated by the bowing of the buffer tube 40 between the buffering-assist capstan 60 and the wet capstan 70. Without being bound to any theory, it is thought that (i) the absence of an elongating tension (e.g., positive tension) between the buffering-assist capstan 60 and the wet capstan 70 encourages shrinkage of the buffer tube 40 before the optical fibers 10 become fully coupled to the buffer tube 40 and (ii) this shrinkage in the absence of positive tension reduces excessive molecular orientation of the polymers that form the buffer tube 40. Furthermore, and without being bound to any theory, it is thought that imparting high molecular orientation into the polymers that form the buffer tube 40 might lead to undesirable post-extrusion shrinkage (PES).

The promotion of buffer-tube shrinkage before coupling has been observed to virtually eliminate post-extrusion shrinkage (PES) in loose buffer tubes. Indeed, the present buffering process achieves loose buffer tubes having EFL of less than 0.1 percent (e.g., between 0 and 0.10 percent) not only during steady-state operation but also during ramping (e.g., startup). It is thought that such low levels of EFL are needed to maintain excellent optical performance in the newer cable designs that employ small-diameter loose buffer tubes.

Tension-Controlled Ramping

The present buffering process yields first-quality loose buffer tubes not only during steady-state operation but also during ramp-up (e.g., startup) and/or ramp-down (e.g., shutdown). In this regard, ramping refers to any change in buffering speed. Indeed, although ramping typically occurs during the startup and/or shutdown of buffering operations, ramping may occur at other times during buffering operations (e.g., during process disruptions).

To achieve tension-controlled ramping, the present buffering process measures and controls buffer-tube tension at the buffering-assist capstan 60 relative to the increasing or decreasing speed of the wet capstan 70. In effect, the present buffering process includes a feedback loop.

Other buffering processes have failed to provide ramping procedures or have merely correlated clincher speed with wet-capstan speed. Directly measuring and controlling buffer-tube tension is superior because it permits the buffering system to accommodate changing process variables, such as cooling water temperature or buffer-tube cooling rates, which could otherwise and unexpectedly promote EFL.

Typically, buffer-tube tension is directly maintained as a function of wet-capstan speed. For example, at any wet-capstan ramping speed (e.g., between the initial startup speed and a steady-state speed) a sensor/transmitter 80 measures the buffer-tube tension at or near the buffering-assist capstan 60 and transmits the measurement to a controller 75. Typically, the buffer-tube tension—typically negative tension (i.e., compression)—is measured at or downstream from the buffering-assist capstan 60 (e.g., between the buffering-assist capstan 60 and the wet capstan 70). That said, it is within the scope of the present invention to measure buffer-tube tension upstream from the buffering-assist capstan 60 (e.g., between the extruder crosshead 20 and the buffering-assist capstan 60). The controller 75 compares this actual tension to the programmed set-point tension, which is predetermined for any given wet-capstan ramping speed. (In this regard, a transmitter 90, which may include speed-sensing capabilities, transmits the speed of the wet capstan 70 to the controller 75.) Typically, the measurement of actual tension and the comparison of actual tension with the programmed set-point tension occurs continuously, particularly during ramping. That said, the measurement and comparison steps may occur intermittently.

If the measured tension sufficiently deviates from the set-point tension, the controller 75 transmits a signal to the buffering-assist capstan 60 to adjust its speed. Alternatively, the ramping method can employ any suitable mechanism for adjusting buffer-tube tension. For example, the apparatus could employ a supplemental tension device for making fine tension adjustments.

For any given wet-capstan ramping speed (e.g., between its steady-state speed and its shutdown speed), a set-point tension at the buffering-assist capstan 60 is determined. This target tension is that which yields the target EFL at the given wet-capstan speed. For example, the relationship between wet-capstan speed and target buffer-tube tension may be a continuous, best-fit equation (e.g., buffer-tube tension as a mathematical function of wet-capstan speed) or a step change relationship (e.g., Δ mpm). Typically, the target tension at a given wet-capstan speed is the same during both ramp-up and ramp-down.

Those having ordinary skill in the art will appreciate that some process testing is required to establish the desired relationship between wet-capstan speed and the target buffer-tube tension. In this regard, buffering processes can vary significantly with respect to production parameters, such as buffer-tube diameter, buffer-tube material, production line speed, and cooling configuration.

At steady state, the target buffer-tube tension is typically such that the buffering-assist capstan 60 runs faster than the wet capstan 70.

In one embodiment of tension-controlled ramping, however, the set-point buffer-tube tension during ramping (e.g., at startup) is such that the buffering-assist capstan 60 runs the same speed or slower than the wet capstan 70. Here, positive tension (e.g., an elongating tension) is created between the buffering-assist capstan 60 and the wet capstan 70.

In an alternative embodiment of tension-controlled ramping, the set-point buffer-tube tension during ramping (e.g., at startup) is such that the buffering-assist capstan 60 runs faster than the wet capstan 70. Here, negative tension (e.g., compression) is created between the buffering-assist capstan 60 and the wet capstan 70 (and an elongating tension exists between the extruder crosshead 20 and the buffering-assist capstan 60).

In another alternative embodiment of tension-controlled ramping, the buffer-tube tension is directly maintained as a function of buffering-assist-capstan speed rather than wet-capstan speed. In this embodiment, at any buffering-assist-capstan ramping speed (e.g., between the initial startup speed and steady-state speed), a sensor/transmitter 80 measures the buffer-tube tension at or near the buffering-assist capstan 60 and transmits the measurement to a controller 75. The controller 75 compares this actual tension to the programmed set-point tension, which is predetermined for any given buffering-assist-capstan ramping speed. If the measured tension deviates from the set-point tension, the controller 75 transmits a signal to the wet capstan 70 to adjust its speed.

It is possible that some buffering operations might be better regulated by varying the speed of a downstream device (e.g., the wet capstan 70) rather than varying the speed of a comparatively upstream device (e.g., the buffering-assist capstan 60).

As explained herein, buffer-tube tension is typically maintained as a function of wet-capstan speed or buffering-assist-capstan speed. That said, the controller 75 may use other variables in determining target tension. For example, one or more temperature sensors may provide the water temperature in the cooling vats 50 and 51 to the controller 75. Other variables such as buffer-tube temperature and ambient temperature may also be used by the controller 75. In effect, the present buffering process may include a feed-forward loop.

In this regard, as buffering speed changes (e.g., increases or decreases) buffer-tube temperature and cooling-vat temperature may also change. For example, at higher buffering speeds, the buffer tube will spend less time in the cooling vats 50 and 51 and thus will have a higher temperature when it emerges from a cooling vat than it would at a lower buffering speed. Moreover, those having ordinary skill in the art will recognize that increasing extruder throughput tends to increase the temperature of the polymer extrudate (i.e., the extruded buffer tube). Similarly, changes in cooling-vat temperature may affect buffer-tube temperature. The controller 75 helps to compensate, directly or indirectly, for process variables (e.g., buffering-assist-capstan speed, wet-capstan speed, cooling-vat temperature, and buffer-tube temperature) that may affect the actual buffer-tube tension or the set-point tension.

Although the foregoing discussion focuses on tension-controlled ramping during startup or shutdown operations, it is within the scope of the present invention to apply the same teachings to any increase or decrease in capstan speed (e.g., increasing or decreasing capstan speed between a first steady-state speed and a second steady-state speed).

Moreover, although the foregoing discussion with respect to steady-state and ramping operations focuses upon the manufacture of gel-filled loose buffer tubes, it is within the scope of the present invention to apply the same teachings to the manufacture of dry loose buffer tubes.

In accordance with the present invention, optical-fiber cables can include the loose buffer tubes made not only during steady-state operation but also during ramping. Such optical-fiber cables should meet or exceed conventional mid-span testing requirements.

Fiber optic cables suitable for mid-span storage are typically subjected to a mid-span temperature cycle test, which assures certain minimum performance specifications for fiber optic cables. As noted, one such test can be found in Bulletin 1753F-601 (PE-90) from the United States Department of Agriculture (USDA) Rural Electrification Administration, which is hereby incorporated by reference in its entirety, an excerpt of which is provided as Appendix I in priority U.S. Patent Application No. 61/148,745.

As used herein and unless otherwise specified, reference to the "mid-span test," the "mid-span temperature cycle test," or the "temperature cycle test" refers the testing procedures set forth in the USDA Rural Electrification Administration mid-span standard, which is outlined as follows:

Buried and underground loose tube single mode cables intended for mid-span applications with tube storage should meet the following mid-span test without exhibiting an increase in fiber attenuation greater than 0.1 dB and a maximum average increase over all fibers of 0.05 dB.

Initially, the test section of the optical-fiber cable is installed in a commercially available pedestal or enclosure or in a device that mimics their performance, as follows: A length of the protective outer jacket, equal to the mid-span length (e.g. 20 feet), is removed from the middle of the test specimen to allow access to the buffer tubes. All binders, tapes, strength members, etc. are removed. The buffer tubes are left intact. The cable ends defining the ends of the mid-span length are properly secured in the enclosure (i.e., as they would be secured within an enclosure in regular commercial use). The strength members are secured with an end-stop-type clamp and the protective outer jacket is clamped to prevent slippage. A minimum of 6.096 meters (20 feet) of cable extends from the entry and exit ports of the enclosure (i.e., 20 feet of the cable remain outside of the enclosure), so that optical measurements may be taken. Typically, the buffer tubes are wound in a coil with a minimum width of three (3) inches and minimum length of 12 inches. The exposed buffer tubes are loosely constrained during the test.

The enclosure, with installed cable, is placed in an environmental chamber for temperature cycling. It is acceptable for some or all of the two 20-foot (6.096 meters) cable segments (i.e., the cable segments that remain outside of the enclosure) to extend outside the environmental chamber.

Lids, pedestal enclosures, or closure covers should be removed if possible to allow for temperature equilibrium of the buffer tubes.

The attenuation of the optical fibers is measured at 1550±10 nanometers. The supplier of the optical-fiber cable must certify that the performance of lower specified wavelengths complies with the mid-span performance requirements.

After measuring the attenuation of the optical fibers, the cable is tested per the FOTP-3 temperature-cycling standard. Temperature cycling, measurements, and data reporting must conform to the FOTP-3 standard. The test is conducted for at least five complete cycles. The following detailed test conditions are applied (i.e., using the environmental chamber) to the enclosure containing the optical-fiber cable: (A) loose tube single mode optical cable sample shall be tested; (B) an 8-inch to 12-inch diameter optical buried distribution pedestal or a device that mimics their performance shall be tested; (C) mid-span opening for installation of loose tube single mode optical cable in pedestal shall be 6.096 meters (20 feet); (D) three hours soak time (i.e., exposure time); (E) Test Condition C-2, minimum −40° C. (−40° F.) and maximum 70° C. (158° F.); (F) a statistically representative amount of transmitting fibers in all express buffer tubes passing through the pedestal and stored shall be measured; and (G) the buffer tubes in the enclosure or pedestal shall not be handled or moved during temperature cycling or attenuation measurements.

Fiber cable attenuation measured through the exposed buffer tubes during the last cycle at −40° C. (−40° F.) and +70° C. (158° F.) should not exceed a maximum increase of 0.1 dB and should not exceed a 0.05 dB average across all tested fibers from the initial baseline measurements. At the conclusion of the temperature cycling, the maximum attenuation increase at 23° C. from the initial baseline measurement should not exceed 0.05 dB in order to allow for measurement noise that may be encountered during the test. The cable should also be inspected at room temperature at the conclusion of all measurements. The cable should not show visible evidence of fracture of the buffer tubes nor show any degradation of the exposed cable assemblies.

Optical-fiber cables in accordance with the present invention should meet the minimum performance specifications required by the mid-span temperature cycle test.

Another mid-span standard is defined by Telcordia Technologies generic requirements for optical-fiber cables as set forth in GR-20-CORE (Issue 2, July 1998; Issue 3, May 2008; Mid-Span Buffer Tube Performance of Stranded Cable—6.5.11), which is hereby incorporated by reference in its entirety and hereinafter referred to as the "GR-20-CORE mid-span standard." This GR-20-CORE mid-span standard is less rigorous than the foregoing mid-span temperature cycle test standard defined by the United States Department of Agriculture (USDA) Rural Electrification Administration. Accordingly, the optical-fiber cables that meet the aforementioned Rural Electrification Administration's mid-span temperature cycle test should also meet or exceed the GR-20-CORE mid-span standard.

To satisfy the GR-20-CORE generic requirements with mid-span buffer tube performance, loose tube single mode cables should exhibit an average change in fiber attenuation of no more than 0.15 dB at 1550 nanometers after mid-span testing. According to the generic requirements for optical-fiber cables as set forth in GR-20-CORE (Mid-Span Buffer Tube Performance of Stranded Cable—6.5.11), "[s]tranded loose-tube cables designed to have loose tubes stored in a pedestal or closure shall be capable of having a minimum of 14 feet of expressed buffer tube stored in a pedestal or closure in normal outside plant conditions without experiencing any unacceptable loss in the optical fibers stored in the expressed tubes."

To supplement the present disclosure, this application incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Pat. No. 7,623,747 for a Single Mode Optical Fiber (de Montmorillon et al.); U.S. Pat. No. 7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (de Montmorillon et al.); U.S. Pat. No. 7,555,186 for an Optical Fiber (Flammer et al.); U.S. Patent Application Publication No. US2009/0252469 A1 for a Dispersion-Shifted Optical Fiber (Sillard et al.); U.S. patent application Ser. No. 12/098,804 for a Transmission Optical Fiber Having Large Effective Area (Sillard et al.), filed Apr. 7, 2008; International Patent Application Publication No. WO 2009/062131 A1 for a Microbend-Resistant Optical Fiber, (Overton); U.S. Patent Application Publication No. US2009/0175583 A1 for a Microbend-Resistant Optical Fiber, (Overton); U.S. Patent Application Publication No. US2009/0279835 A1 for a Single-Mode Optical Fiber Having Reduced Bending Losses, filed May 6, 2009, (de Montmorillon et al.); U.S. Patent Application Publication No. US2009/0279836 A1 for a Bend-Insensitive Single-Mode Optical Fiber, filed May 6, 2009, (de Montmorillon et al.); U.S. patent application Ser. No. 12/489,995 for a Wavelength Multiplexed Optical System with Multimode Optical Fibers, filed Jun. 23, 2009, (Lumineau et al.); U.S. patent application Ser. No. 12/498,439 for a Multimode Optical Fibers, filed Jul. 7, 2009, (Gholami et al.); U.S. patent application Ser. No. 12/614,011 for a Reduced-Diameter Optical Fiber, filed Nov. 6, 2009, (Overton); U.S. patent application Ser. No. 12/614,172 for a Multimode Optical System, filed Nov. 6, 2009, (Gholami et al.); U.S. patent application Ser. No. 12/617,316 for an Amplifying Optical Fiber and Method of Manufacturing, filed Nov. 12, 2009, (Pastouret et al.) U.S. patent application Ser. No. 12/629,495 for an Amplifying Optical Fiber and Production Method, filed Dec. 2, 2009, (Pastouret et al.); U.S. patent application Ser. No. 12/633,229 for an Ionizing Radiation-Resistant Optical Fiber Amplifier, filed Dec. 8, 2009, (Regnier et al.); U.S. patent application Ser. No. 12/636,277 for a Buffered Optical Fiber, filed Dec. 11, 2009, (Testu et al.); U.S. patent application Ser. No. 12/683,775 for a Method of Classifying a Graded-Index Multimode Optical Fiber, filed Jan. 7, 2010, (Gholami et al.); U.S. patent application Ser. No. 12/692,161 for a Single-Mode Optical Fiber, filed Jan. 22, 2010, (Richard et al.); U.S. patent application Ser. No. 12/694,533 for a Single-Mode Optical Fiber Having an Enlarged Effective Area, filed Jan. 27, 2010, (Sillard et al.); and U.S. patent application Ser. No. 12/694,559 for a Single-Mode Optical Fiber, filed Jan. 27, 2010, (Sillard et al.).

To supplement the present disclosure, this application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Pat. No. 7,570,852 for an Optical Fiber Cable Suited for Blown Installation or Pushing Installation in Microducts of Small Diameter (Nothofer et al.); U.S. Pat. No. 7,646,954 for an Optical Fiber Telecommunications Cable (Tatat); U.S. Pat. No. 7,599,589 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Patent Application Publication No. US2009/0041414 A1 for a Method for Accessing Optical Fibers within a Telecommunication Cable (Lavenne et al.); U.S. Pat. No. 7,639,915 for an Optical Fiber Cable Having a Deformable Coupling Element (Parris et al.); U.S. Pat. No. 7,646,952 for an Optical Fiber Cable Having Raised Coupling Supports (Parris); U.S. Patent Application Publication No. US2009/0003785 A1 for a Coupling Composition for Optical Fiber Cables (Parris et al.); U.S. Patent Application Publication No. US2009/0214167 A1 for a Buffer Tube with Hollow Channels, (Lookadoo et al.); U.S. patent application Ser. No. 12/466,965 for an Optical Fiber Telecommunication Cable, filed May 15, 2009, (Tatat); U.S. patent application Ser. No. 12/506,533 for a Buffer Tube with Adhesively Coupled Optical Fibers and/or Water-Swellable Element, filed Jul. 21, 2009, (Overton et al.); U.S. patent application Ser. No. 12/557,055 for an Optical Fiber Cable Assembly, filed Sep. 10, 2009, (Barker et al.); U.S. patent application Ser. No. 12/557,086 for a High-Fiber-Density Optical Fiber Cable, filed Sep. 10, 2009, (Louie et al.); U.S. patent application Ser. No. 12/558,390 for a Buffer Tubes for Mid-Span Storage, filed Sep. 11, 2009, (Barker); U.S. patent application Ser. No. 12/614,692 for Single-Fiber Drop Cables for MDU Deployments, filed Nov. 9, 2009, (Overton); U.S. patent application Ser. No. 12/614,754 for Optical-Fiber Loose Tube Cables, filed Nov. 9, 2009, (Overton); U.S. patent application Ser. No. 12/615,003 for a Reduced-Size Flat Drop Cable, filed Nov. 9, 2009, (Overton et al.); U.S. patent application Ser. No. 12/615,106 for ADSS Cables with High-Performance Optical Fiber, filed Nov. 9, 2009, (Overton); U.S. patent application Ser. No. 12/615,698 for Reduced-Diameter Ribbon Cables with High-Performance Optical Fiber, filed Nov. 10, 2009, (Overton); U.S. patent application Ser. No. 12/615,737 for a Reduced-Diameter, Easy-Access Loose Tube Cable, filed Nov. 10, 2009, (Overton); U.S. patent application Ser. No. 12/642,784 for a Method and Device for Manufacturing an Optical Preform, filed Dec. 19, 2009, (Milicevic et al.); U.S. patent application Ser. No. 12/648,794 for a Perforated Water-Blocking Element, filed Dec. 29, 2009, (Parris); and U.S. patent application Ser. No. 12/649,758 for a UVLED Apparatus for Curing Glass-Fiber Coatings, filed Dec. 30, 2009, (Hartsuiker et al.).

In the specification and/or FIGURE, typical embodiments of the invention have been disclosed. The present invention is not limited to such exemplary embodiments. The FIGURE is a schematic representation and so is not necessarily drawn to scale. Unless otherwise noted, specific terms have been used in a generic and descriptive sense and not for purposes of limitation.

The invention claimed is:
1. A method for making loose buffer tubes, comprising:
passing an extruded buffer tube through (i) a buffering-assist capstan defining a speed of the buffering-assist capstan and (ii) a wet capstan defining a speed of the wet capstan, the wet capstan being positioned downstream from the buffering-assist capstan;
increasing the speed of the wet capstan from an initial startup speed to a steady-state speed, the extruded buffer tube defining a ramping tension between the buffering-assist capstan and the wet capstan while the speed of the wet capstan is increased from the initial startup speed to the steady-state speed;
measuring the ramping tension of the extruded buffer tube before the wet capstan achieves the steady-state speed;
comparing the measured ramping tension of the extruded buffer tube against a target ramping tension; and
adjusting the ramping tension if the measured ramping tension substantially deviates from the target ramping tension;
wherein, while increasing the speed of the wet capstan from the initial startup speed to the steady-state speed, the speed of the buffering-assist capstan exceeds the speed of the wet capstan in order to preclude an elongating ramping tension between the buffering-assist capstan and the wet capstan.

2. The method according to claim 1, wherein the step of measuring the ramping tension comprises measuring the ramping tension of the extruded buffer tube at or near the buffering-assist capstan.

3. The method according to claim 1, wherein the step of measuring the ramping tension occurs continuously.

4. The method according to claim 1, wherein the step of measuring the ramping tension occurs intermittently.

5. The method according to claim 1, wherein the step of comparing the measured ramping tension of the extruded buffer tube against the target ramping tension occurs continuously.

6. The method according to claim 1, wherein the step of comparing the measured ramping tension of the extruded buffer tube against the target ramping tension occurs continuously while the speed of the wet capstan increases from the initial startup speed to the steady-state speed.

7. The method according to claim 1, wherein the step of comparing the measured ramping tension of the extruded buffer tube against the target ramping tension occurs intermittently.

8. The method according to claim 1, wherein the step of adjusting the ramping tension comprises adjusting the speed of the buffering-assist capstan.

9. The method according to claim 1,
comprising calculating the target ramping tension as a function of the speed of the wet capstan.

10. The method according to claim 1, wherein the target ramping tension corresponds to the speed of the wet capstan.

11. The method according to claim 1, wherein the buffering-assist capstan has at an initial startup speed that is about the same as the initial startup speed of the wet capstan.

12. The method according to claim 1, wherein the buffering-assist capstan has at an initial startup speed that is greater than the initial startup speed of the wet capstan.

13. The method according to claim 1, wherein, while increasing the speed of the wet capstan from the initial startup speed to the steady-state speed, the speed of the buffering-assist capstan exceeds the speed of the wet capstan to thereby subject the extruded buffer tube to a compressive force between the buffering-assist capstan and the wet capstan.

14. A method for making loose buffer tubes, comprising:
passing an extruded buffer tube through (i) a buffering-assist capstan defining a speed of the buffering-assist capstan and (ii) a wet capstan defining a speed of the wet capstan, the wet capstan being positioned downstream from the buffering-assist capstan;
increasing the speed of the buffering-assist capstan from an initial startup speed to a steady-state speed, the extruded buffer tube defining a ramping tension between the buffering-assist capstan and the wet capstan while the speed of the buffering-assist capstan is increased from the initial startup speed to the steady-state speed;
measuring the ramping tension of the extruded buffer tube before the buffering-assist capstan achieves the steady-state speed;
comparing the measured ramping tension of the extruded buffer tube against a target ramping tension; and
adjusting the ramping tension if the measured ramping tension substantially deviates from the target ramping tension;
wherein, while increasing the speed of the buffering-assist capstan from the initial startup speed to the steady-state speed, the speed of the buffering-assist capstan exceeds the speed of the wet capstan in order to preclude an elongating ramping tension between the buffering-assist capstan and the wet capstan.

15. The method according to claim 14, wherein the step of measuring the ramping tension comprises measuring the ramping tension of the extruded buffer tube at or near the buffering-assist capstan.

16. The method according to claim 14, wherein the step of comparing the measured ramping tension of the extruded buffer tube against a target ramping tension occurs continuously while the speed of the buffering-assist capstan increases from its the initial startup speed to the steady-state speed.

17. The method according to claim 14, wherein the step of adjusting the ramping tension comprises adjusting the speed of the wet capstan.

18. The method according to claim 14, comprising calculating the target ramping tension as function of the speed of the buffering-assist capstan.

19. The method according to claim 14, wherein the target ramping tension corresponds to the speed of the buffering-assist capstan.

20. The method according to claim 14, wherein, while increasing the speed of the buffering-assist capstan from the initial startup speed to the steady-state speed, the speed of the buffering-assist capstan exceeds the speed of the wet capstan to thereby subject the extruded buffer tube to a compressive force between the buffering-assist capstan and the wet capstan.

21. A method for making loose buffer tubes, comprising:
passing an extruded buffer tube through (i) a buffering-assist capstan defining a speed of the buffering-assist capstan and (ii) a wet capstan defining a speed of the wet capstan, the wet capstan being positioned downstream from the buffering-assist capstan;
decreasing the speed of the wet capstan from an initial steady-state speed to a shutdown speed, the extruded buffer tube defining a ramping tension between the buffering-assist capstan and the wet capstan while the speed of the wet capstan is decreased from the initial steady-state speed to the shutdown speed;
measuring the ramping tension of the extruded buffer tube before the wet capstan achieves the shutdown speed;
comparing the measured ramping tension of the extruded buffer tube against a target ramping tension; and
adjusting the ramping tension if the measured ramping tension substantially deviates from the target ramping tension;
wherein, while decreasing the speed of the wet capstan from the initial steady-state speed to the shutdown speed, the speed of the buffering-assist capstan exceeds the speed of the wet capstan in order to preclude an elongating ramping tension between the buffering-assist capstan and the wet capstan.

22. The method according to claim 21, wherein the step of measuring the ramping tension comprises measuring the ramping tension of the extruded buffer tube at or near the buffering-assist capstan.

23. The method according to claim 21, wherein the step of adjusting the ramping tension comprises adjusting the speed of the buffering-assist capstan.

24. The method according to claim 21, comprising calculating the target ramping tension as a function of the speed of the wet capstan.

25. The method according to claim 21, wherein the target ramping tension corresponds to the speed of the wet capstan.

26. The method according to claim 21, wherein, while decreasing the speed of the wet capstan from the initial steady-state speed to the shutdown speed, the speed of the buffering-assist capstan exceeds the speed of the wet capstan to thereby subject the extruded buffer tube to a compressive force between the buffering-assist capstan and the wet capstan.

27. A method for making loose buffer tubes, comprising:
passing an extruded buffer tube through (i) a buffering-assist capstan defining a speed of the buffering-assist capstan and (ii) a wet capstan defining a speed of the wet capstan, the wet capstan being positioned downstream from the buffering-assist capstan;
decreasing the speed of the buffering-assist capstan from an initial steady-state speed to a shutdown speed, the extruded buffer tube defining a ramping tension between the buffering-assist capstan and the wet capstan while the speed of the buffering-assist capstan is decreased from the initial steady-state speed to the shutdown speed;
measuring the ramping tension of the extruded buffer tube before the buffering-assist capstan achieves the shutdown speed;
comparing the measured ramping tension of the extruded buffer tube against a target ramping tension; and
adjusting the ramping tension if the measured ramping tension substantially deviates from the target ramping tension;
wherein, while decreasing the speed of the buffering-assist capstan from the initial steady-state speed to the shutdown speed, the speed of the buffering-assist capstan exceeds the speed of the wet capstan in order to preclude an elongating ramping tension between the buffering-assist capstan and the wet capstan.

28. The method according to claim 27, wherein the step of measuring the ramping tension comprises measuring the ramping tension of the extruded buffer tube at or near the buffering-assist capstan.

29. The method according to claim 27, wherein the step of adjusting the ramping tension comprises adjusting the speed of the wet capstan.

30. The method according to claim 27, comprising calculating the target ramping tension as function of the speed of the buffering-assist capstan.

31. The method according to claim 27, wherein the target ramping tension corresponds to the speed of the buffering-assist capstan.

32. The method according to claim 27, wherein, while decreasing the speed of the buffering-assist capstan from the initial steady-state speed to the shutdown speed, the speed of the buffering-assist capstan exceeds the speed of the wet capstan to thereby subject the extruded buffer tube to a compressive force between the buffering-assist capstan and the wet capstan.

* * * * *